United States Patent [19]

Brockmann et al.

[11] 4,213,016
[45] Jul. 15, 1980

[54] ARRANGEMENT FOR MEASURING THE LINE CONDITION OF A SUBSCRIBER'S LINE CIRCUIT BY MEANS OF A MEASURING RESISTOR

[75] Inventors: Klaus-Dieter K. Brockmann, Hilversum; Eise C. Dijkmans, Eindhoven, both of Netherlands

[73] Assignee: U.S. Philips Corporation, New York, N.Y.

[21] Appl. No.: 912,455

[22] Filed: Jun. 5, 1978

[30] Foreign Application Priority Data

Mar. 6, 1978 [NL] Netherlands .......................... 7802422

[51] Int. Cl.² ...................... H04B 3/46; H04M 19/00
[52] U.S. Cl. ............................. 179/175.3 R; 179/77; 179/18 FA

[58] Field of Search .................. 179/175.3 R, 175.2 C, 179/70, 77, 1 MN, 15 BF, 16 EC, 16 F, 18 F, 18 FA; 324/62, 126, 127, 128

[56] References Cited

U.S. PATENT DOCUMENTS

| 3,912,884 | 10/1975 | Membrino et al. | 179/175.2 C |
|---|---|---|---|
| 3,965,447 | 6/1976 | Thomas | 179/16 EC |

*Primary Examiner*—Bernard Konick
*Assistant Examiner*—Joseph A. Popek
*Attorney, Agent, or Firm*—Thomas A. Briody; William J. Streeter; Bernard Franzblau

[57] ABSTRACT

The line condition of a subscriber's line circuit supplied by an A.C. signal generator and an AC/DC converter is measured by means of a measuring resistor. The measuring resistor is inductively coupled to the supply circuit, which simplifies the measuring circuit.

9 Claims, 4 Drawing Figures

ARRANGEMENT FOR MEASURING THE LINE CONDITION OF A SUBSCRIBER'S LINE CIRCUIT BY MEANS OF A MEASURING RESISTOR

The invention relates to an arrangement for measuring the line condition of a subscriber's line current by means of a measuring resistor, the subscriber's line being supplied via an AC/DC converter coupled to a square-wave signal generator.

Such an arrangement is disclosed in U.S. Pat. No. 3,965,447. The arrangement described in this patent specification comprises a floating supply, and an AC/DC converter including a transformer and a rectifying circuit. The square-wave signal generator is connected to a primary winding and the rectifying circuit to a secondary winding of a transformer, the subscriber being coupled to the rectifying circuit. The line condition of the subscriber's line is measured or supervised by means of a measuring resistor included in the subscriber's line. A measuring device is connected to the measuring resistor to determine the line condition. The measuring device must be capable of measuring the voltage difference across the measuring resistor at the voltage level of the subscriber's line. The contemporary electronic circuits operate with a relatively low supply voltage so that, when using these circuits for the measuring device, additional means are necessary to enable measurements at the voltage level of the subscriber's line. As a result the measuring device is complicated.

It is an object of the invention to provide an arrangement of the type defined in the first paragraph which obviates said drawbacks and in which a simple measuring device is sufficient.

The arrangement according to the invention is characterized in that the measuring resistor is inductively coupled to a conductor in which the square-wave signals supplied by the square-wave signal generator are present.

The invention has the advantage that the measuring device coupled to the measuring resistor can be implemented in a simple manner because measurements can be effected relative to ground of the measuring arrangement and the voltage level is matched to the level of contemporary electronics. Also, the measuring resistor is not included in the (speech) a.c. voltage circuit and the impedance of the measuring resistor can be matched in a simple manner to the impedance of the measuring arrangement coupled thereto. A further advantage is that the diverse requirements for the values of the line impedance of the different telecommunication can be satisfied. Said adaptations can be realised by the winding ratio and/or the value of the measuring resistor.

The transformer required for realising a floating supply can also be utilized for the device for measuring the line condition. Therefore, in accordance with the foregoing, an embodiment according to the invention connects the measuring resistor to a second secondary winding of the transformer. Next to the advantages already mentioned, this realisation also furnishes an economical advantage.

Another embodiment according to the invention is characterized in that the AC/DC converter comprises a second transformer and the rectifying circuit comprises two switches provided with control inputs through which switches the primary winding of the second transformer is connected to the secondary winding of the first transformer and the subscriber's line is coupled to the center taps of the secondary winding of the first transformer and the primary winding of the second transformer. A control device, connected to the control inputs of the switches, is provided for supplying complementary square-wave signals whose phases are shifted in dependence on the supply polarity to be generated for the subscriber's line relative to the square-wave signal supplied by the square-wave signal generator to the control inputs. The measuring resistor is connected to the secondary winding of the second transformer and a scanning circuit is present, connected to the measuring resistor and the control device, which, under the control of a scanning pulse supplied by the control circuit and positioned in the centre of one of the complementary square-wave signals scans the line condition, supplied to the measuring resistor via the second transformer, for determining the value and the polarity of the d.c. current flowing in the subscriber's line. To measure the line condition of the subscriber's line it is necessary in this embodiment that the size and the polarity of the signals be determined. This implementation provides an efficient measurement of both parameters.

The signals which are transmitted over the subscriber's line for ringing the subscriber hamper the detection of the instant the subscriber lifts the receiver from the hook during ringing. As is known, measuring the line condition can, for example, be done in an improved manner if the signal originating from the measuring resistor is passed during ringing with a sinusoidal signal through a filter for suppressing the signal.

The measurement can be effected with simpler means in the time available therefor, if, in accordance with the invention, the transfer characteristic of the filter has zeroes for the ringing frequency and the harmonics of the ringing frequency.

The invention and its advantages will be further explained with reference to the accompanying drawing in which corresponding elements have been given the same reference numerals and wherein.

Figure 1:
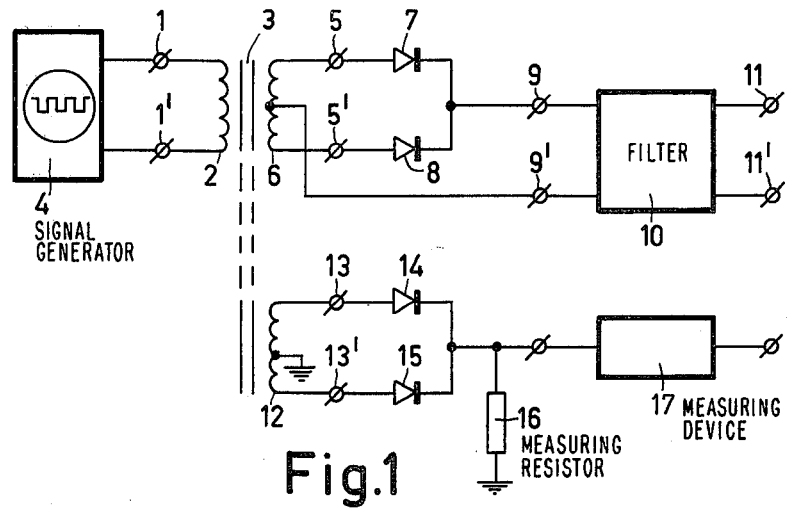
FIG. 1 shows an embodiment according to the invention of a floating supply and a measuring resistor inductively coupled thereto.

In the supply circuit shown in FIG. 1 reference numerals 1-1' denote the terminals of a primary winding 2 of a transformer 3, which are coupled to a square-wave signal generator 4 having a current source character. The terminals 5-5' of a secondary winding 6 are connected to rectifiers 7 and 8 which are depicted in the figure as diodes. The pulse-shaped signals generated by the generator 4 are applied to the rectifiers via transformer 3. The rectified signals are taken off from the centre tap of the secondary winding 6 and the outputs of the rectifiers 7 and 8 and are applied via the input terminals 9 and 9' to the filter 10 which smoothes these signals and supplies a d.c. voltage at its output terminals 11-11'.

A subscriber's line is connected to the terminals 11-11'. The transformer further comprises a second secondary winding 12. The a.c. voltage signals induced in this winding are rectified by means of the rectifiers 14 and 15 coupled to terminals 13 and 13' and are applied to a measuring resistor 16. For the choice of the winding ratio of the primary winding 2 and the secondary winding 12 and the value of the measuring resistor 18, the diverse requirements imposed by the telecommunication companies on the load through the measuring resistance of the line can now be taken into account. On the other hand the value of the measuring resistor can be matched to the input impedance of the measuring device 17 coupled to the measuring resistor. The measuring device 17 is arranged to detect at least the closing of the subscriber's loop before dialing and closing of the subscriber's loop during ringing. To this end the measuring device is provided with a prior art level detector for measuring the value of the direct current flowing in the subscriber's line circuit and a filter for suppressing the ringing signals.

Figure 2:
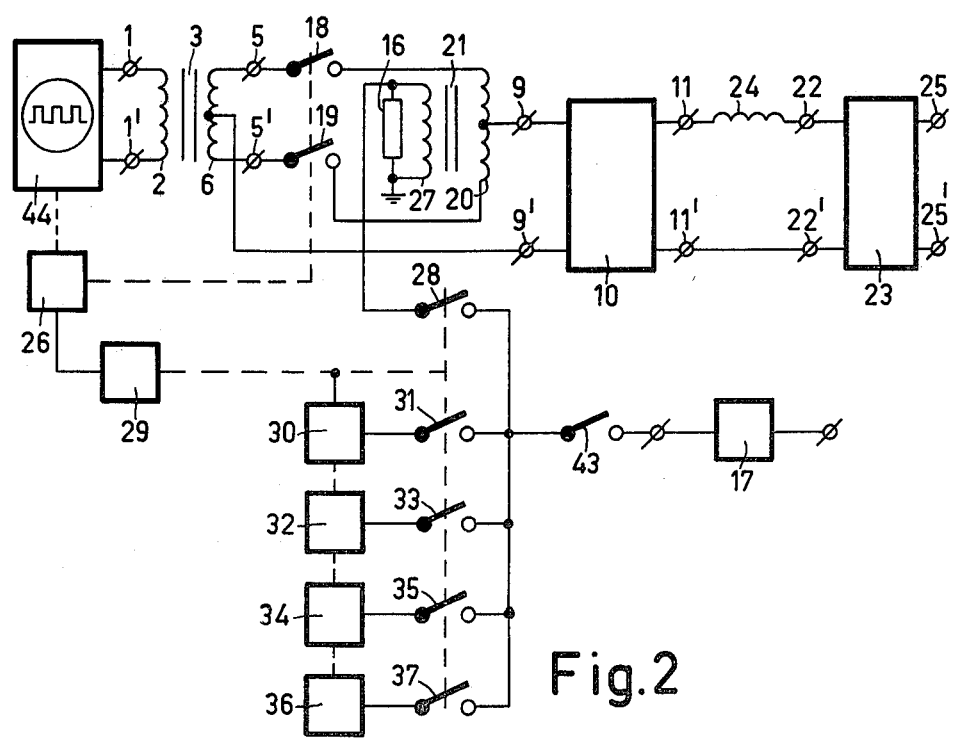
FIG. 2 shows another embodiment according to the invention of a floating supply and a measuring resistor inductively coupled thereto for determining the value and polarity of the subscriber's line signals.

In the embodiment shown schematically in FIG. 2, the terminals 1, 1' of a primary winding 2 of a first transformer 3 are coupled to a square-wave signal generator 44 having a voltage source character. The terminals 5–5' of the secondary winding 6 are connected to rectifiers 18 and 19, provided with control inputs, and shown in the figure as switches. The outputs of the rectifiers 18 and 19 are applied to the primary winding 20 of a second transformer 21. The centre tap of the secondary winding 6 of the first transformer 3 and the centre tap of the primary winding 20 of the second transformer 21 are connected to the input terminals 9–9' of a filter 10. The output terminals 11–11' of filter 10 are coupled to the input terminals 22–22' of a hybrid or fork circuit 23, provided an impedance which is high-ohmic for alternating current, for example a coil 24, is included between terminal 11 and terminal 22. The subscriber's line is connected to the terminals 25–25'.

Figure 3:
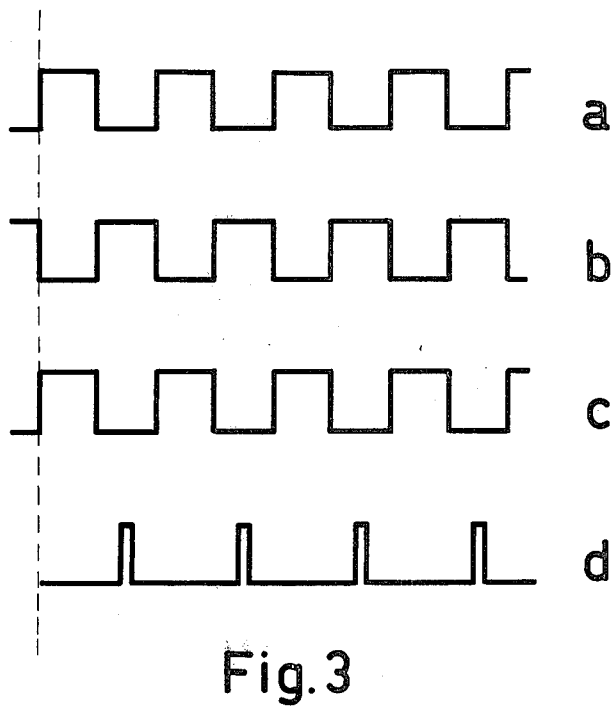
FIG. 3 shows a diagram of some signal waveforms occurring in FIG. 1 and FIG. 2.

The operation is as follows. The pulse-shaped signals, shown in FIG. 3a and generated by generator 44, are applied via the first transformer 3 to the rectifying circuit which supplies rectified signals under the control of a control device 26 to the centre tap of the primary winding of the second transformer and the centre tap of the secondary winding of the first transformer, which centre taps are connected to terminals 9–9'. Complementary square-wave signals, whose phase is shifted in dependence on the supply polarity to be generated for the subscriber's line relative to the pulse-shaped signal supplied by the square-wave signal generator 4, are applied to the control inputs of switches 18 and 19, as shown in FIGS. 3b and 3c. The phase relation between the square-wave generator 44 and the control device 26 is guaranteed by coupling the square-wave generator to the control device. As described in a copending U.S. patent application Ser. No. 912,454, filed June 5, 1978, this phase-dependent control is also used for generating sinusoidal ringing signals in a simple manner. The control of the switches 18 and 19 by control device 26 is schematically shown in the figure by means of a dotted line. The impedance 24 serves for blocking speech signals originating from the subscriber's line. Circuit 23 constitutes a hybrid circuit for coupling the speech signals in and out.

The second transformer 21 comprises a secondary winding 27. The a.c. voltage signals induced in this winding are applied to the measuring resistor 16 connected thereto. The polarity of the pulse voltage immediately behind one of the switches 18 and 19 is positive or negative, depending on the phase relation chosen by the control device, relative to the polarity at the centre tap of the secondary winding 6 of the first transformer 3. In order to determine unambiguously the polarity of the current through the measuring resistor the voltage across the measuring resistor 16 is supplied to a third switch 43 during a period of time determined by the period when a fourth switch 28 is closed. The fourth switch 28 is controlled by a scanning pulse originating from a scanning circuit 29. The scanning circuit 29 is coupled to control device 26. The scanning pulse is located in the centre of one of the complementary square-wave signals, as shown in FIG. 3d. Measuring is done as follows. From all the possible scanning pulses located in the centre of the square-wave signal having a repetition rate of, for example 100 kHz, scanning pulses are selected having a lower repetition rate of, for example, 200 Hz to obtain a reduction of the measuring frequency. Switch 28 will be closed for a short period of time under the control of the scanning pulse supplied by the scanning circuit 29. Switch 43 is closed simultaneously with switch 28 so that the signal measured across the measuring resistor can flow to measuring device 17.

In addition to measuring the signal originating from measuring resistor 16 and applied via switch 28, measuring device 17 can also be used for measuring signals originating from measuring resistors provided in other subscriber's line circuits. Circuit 17 will be made available for a short period of time to each subscriber coupled thereto. FIG. 2 shows schematically four additional line circuits and the measuring resistors included therein, namely line circuit 30 with switch 31, line circuit 32 with switch 33, line circuit 34 with switch 35 and line circuit 36 with switch 37. The outputs of the switches 28, 31, 33, 35 and 37 are interconnected and connected to switch 43. The switches 28, 31, 33, 35 and 37 are now successively closed for a short period of time under the control of the scanning circuit 29 and in relation to control device 26, causing the corresponding measuring values to be available at the input of switch 43.

Figure 4:
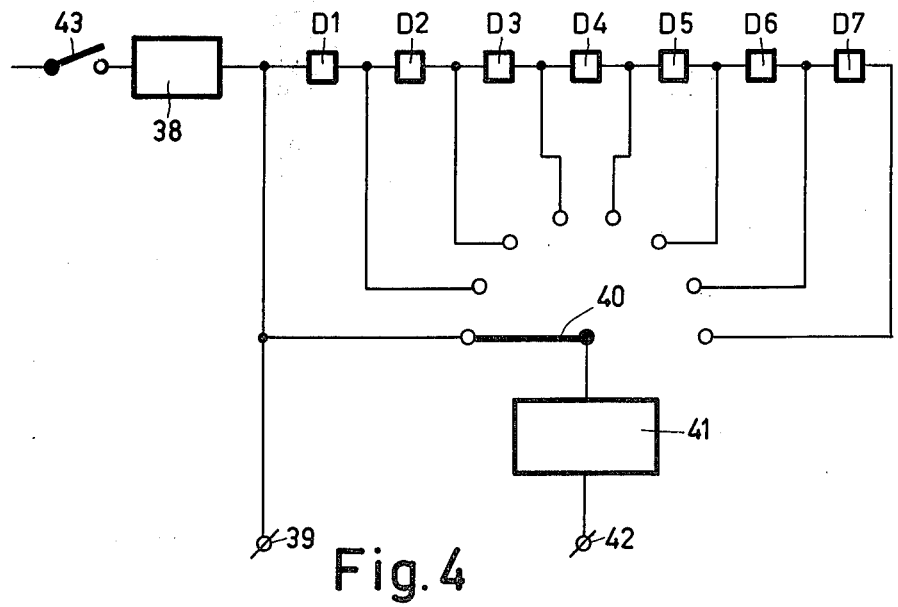
FIG. 4 shows a measuring arrangement with a digital filter included therein for use in an embodiment according to the invention as shown in FIGS. 1 and 2.

FIG. 4 shows an embodiment of the filter which may be included in the measuring device 17 for suppressing the ringing signals. When a subscriber lifts the reveiver from the hook, the subscriber's line is closed causing a current change which is transferred via the inductive coupling to the measuring resistor and this signal will reach switch 43 in the above-described manner. Because switch 43 closes, the signal will be applied to an A/D converter 38. A prior art level detector which is connected to terminal 39 and which, for example, compares the measured digitized value with a preset value is now capable of detecting the closing of the subscriber's loop. If a subscriber lifts the receiver from the hook during ringing, this imposes higher requirements on the measuring device because the ringing signals hamper the detection process. It is known that a filter can be included for this purpose. The filter according to the invention, shown in FIG. 4, consists of a number of delay elements $D_1$ to $D_7$ inclusive. Each delay element has a transfer function which, after z-transformation, is equal to $z^{-1}$. The z-transformed transfer function of the filter is given by $$H(z) = 1 + z^{-1} + z^{-2} + z^{-3} + z^{-4} + z^{-5} + z^{-6} + z^{-7}.$$

The transfer function is characterized in that the zeroes are located at $\frac{1}{4}, \frac{1}{2}, \frac{3}{4}$ of the Nyquist frequency and the Nyquist frequency itself. The coefficients of the powers of z in the transfer function H(z) are all equal to 1, so that the weighting factors all have the value 1 and have not been included in FIG. 4 as such. The transfer function is realised by sampling, by means of a switch 40, the signal at the input of the filter and after each delay element. The samples are added and stored in known manner by an adder and register 41.

Ringing is done by means of sinusoidal signals. If now the frequency at which the first zero of H(z) occurs is chosen to be equal to the ringing frequency, all harmonics of the ringing frequency, which do not coincide with the scanning frequency, and multiples thereof, will also coincide with the frequencies of corresponding zeroes of the digital filter, so that in principle an infinitely high suppression is obtained for these frequencies. If the scanning frequency comprises a multiple of the mains frequency, an infinitely high suppression will also be obtained for the mains frequency and the harmonics.

By means of a level detector of a prior art type, lifting of the receiver from the hook during ringing can be reliably measured at terminal 42. This level detector can be combined with the level detector connected to terminal 39.

What is claimed is:

1. An arrangement for the line supervision of a subscriber's line circuit comprising, a measuring resistor, a rectangular waveform signal generator, an AC/DC converter, conductor means coupling the subscriber's line circuit to said signal generator via the AC/DC converter, means for inductively coupling the measuring resistor to the subscriber's line circuit and to a part of the conductor means in which the rectangular waveform signals supplied by the signal generator are present, and a measuring device coupled to the measuring resistor for measuring the signal across said resistor.

2. An arrangement as claimed in claim 1, wherein the AC/DC converter comprises a transformer having a primary winding and first and second secondary windings and a rectifying circuit, and wherein the signal generator comprises a current source and is connected to the transformer primary winding and the rectifying circuit is connected to the first secondary winding of the transformer, and wherein the subscriber's line circuit is coupled to the rectifying circuit, the measuring resistor being connected via rectifying means to the second secondary winding of the transformer so that a signal is developed across the resistor which represents the value of the direct current flowing in the subscriber's line circuit.

3. An arrangement as claimed in claim 1, wherein the AC/DC converter comprises a first transformer having a primary and a secondary winding and a rectifying circuit, and wherein the signal generator comprises a square wave signal voltage source connected to the primary winding of the first transformer and the rectifying circuit is connected to the secondary winding of the first transformer, the AC/DC converter further comprising a second transformer having primary and secondary windings and the rectifying circuit comprising two controlled switches having control inputs, means including said controlled switches for connecting the primary winding of the second transformer to the secondary winding of the first transformer, means coupling the subscriber's line circuit to centre taps of the secondary winding of the first transformer and to the primary winding of the second transformer, a control device connected to the control inputs of the switches for supplying to the control inputs complementary square-wave signals whose phases are shifted in dependence on the supply polarity to be generated for the subscriber's line, relative to the square-wave signal supplied by the square-wave signal generator, the measuring resistor being connected to the secondary winding of the second transformer, and a scanning circuit connected to the measuring resistor and the control device and which, under the control of a scanning pulse supplied by the control device that is timed to occur at the centre of one of the complementary square-wave signals, samples the signal across the measuring resistor which represents the magnitude and the polarity of the direct current flowing in the subscriber's line circuit.

4. An arrangement as claimed in claim 1 wherein the measuring device includes a filter and the signal across the measuring resistor is passed during ringing along with a sinusoidal ringing signal through said filter for suppressing the ringing signal, and wherein the transfer characteristic of the filter has zeroes for the ringing frequency and harmonics of the ringing frequency.

5. An arrangement as claimed in claim 4 wherein the measuring device includes a sampling circuit for sampling the signal across the measuring resistor, an analog-to-digital converter for converting the signal samples into digital signals, and wherein the filter comprises a digital filter.

6. A telephone exchange comprising a plurality of line supervision arrangements as claimed in claim 1 each of which is associated with an individual subscriber's line circuit and each including a measuring resistor, the exchange further comprising means for scanning in time-division multiplex the measuring resistors provided individually for each subscriber's line and supplying the individual measuring signals to a single measuring device in mutually exclusive time intervals.

7. A system for monitoring a telephone subscriber's line circuit comprising, a signal generator for generating a signal having a periodic waveform, an AC/DC converter, circuit means coupling the signal generator to the subscriber's line circuit via the AC/DC converter, a measuring resistor, means for inductively coupling the measuring resistor to the subscriber's line circuit via a part of said circuit means in which the periodic waveform signal flows, and a measuring device coupled to the measuring resistor for measuring the signal developed thereacross.

8. A monitoring system as claimed in claim 7 wherein the signal generator comprises a square-wave generator and the AC/DC converter comprises a transformer having a primary winding coupled to the output of the square-wave generator and a secondary winding coupled to the subscriber's line circuit via a rectifying circuit.

9. A monitoring system as claimed in claim 7 wherein the signal generator comprises a square-wave generator and the AC/DC converter comprises first and second transformers each having primary and secondary windings and a rectifying circuit that includes two controlled switching devices, and said circuit means comprises, means coupling the first transformer primary winding to the output of the square-wave generator and the first transformer secondary winding to the second transformer primary winding via said two switching devices, and means coupling the subscriber's line circuit to the first transformer secondary winding and to the second transformer primary winding, and said inductive coupling means includes means connecting the measuring resistor to the second transformer secondary winding, said system further comprising a control device coupled to control inputs of the two switching devices for operating said switching devices out of phase with each other, and means coupling the control device to the square-wave generator so as to synchronize the operation of the square-wave generator and the control device.

* * * * *